US010411228B2

United States Patent
Bosch et al.

(10) Patent No.: US 10,411,228 B2
(45) Date of Patent: Sep. 10, 2019

(54) BATTERY CELL WITH PARTIALLY FLEXIBLE AND MOLDABLE WALL

(71) Applicant: Robert Bosch GmbH, Stuttgart (DE)

(72) Inventors: Andreas Bosch, Oberriexingen (DE); Sarmimala Hore, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 218 days.

(21) Appl. No.: 15/332,073

(22) Filed: Oct. 24, 2016

(65) Prior Publication Data

US 2017/0117518 A1 Apr. 27, 2017

(30) Foreign Application Priority Data

Oct. 22, 2015 (DE) .................. 10 2015 220 595

(51) Int. Cl.
*H01M 2/10* (2006.01)
*H01M 10/0525* (2010.01)

(52) U.S. Cl.
CPC ..... *H01M 2/1016* (2013.01); *H01M 10/0525* (2013.01)

(58) Field of Classification Search
CPC . H01M 2/1016; H01M 2/0282; H01M 2/0292
See application file for complete search history.

(56) References Cited

U.S. PATENT DOCUMENTS

| 4,005,054 A * | 1/1977 | Bonnefon | ............... C08L 21/00 264/175 |
| 6,232,015 B1 | 5/2001 | Wyser | |
| 2004/0142233 A1 * | 7/2004 | Park | ..................... H01M 2/1011 429/100 |
| 2010/0216016 A1 * | 8/2010 | Seino | ..................... H01M 2/021 429/185 |
| 2014/0093751 A1 * | 4/2014 | Schaefer | ............. H01M 2/1072 429/7 |
| 2014/0193702 A1 | 7/2014 | Woehrle et al. | |
| 2014/0322588 A1 * | 10/2014 | Duernegger | ........ H01M 2/0267 429/149 |

FOREIGN PATENT DOCUMENTS

| DE | 69816266 | 5/2004 |
| DE | 102007024869 | 12/2008 |
| WO | 2012038160 | 3/2012 |

OTHER PUBLICATIONS

"Biomimetic materials." Definitions.net. STANDS4 LLC, 2018. Web. Jul. 9, 2018. <https://www.definitions.net/definition/Biomimetic materials>. (Year: 2018).*
Gillies. G., et al., "Gecko toe and lamellar shear adhesion on macroscopic, engineered rough surfaces," The Journal of Experimental Biology (2014) 217, 283-289.

* cited by examiner

*Primary Examiner* — Maria Laios
(74) *Attorney, Agent, or Firm* — Michael Best & Friedrich LLP

(57) ABSTRACT

A battery cell having at least one battery cell housing and at least one at least partially flexible and moldable wall, wherein the wall is arranged on the battery cell housing. The wall is at least partially comprised of a biomimetic material. Also a battery module with at least one battery cell according to the invention.

22 Claims, 1 Drawing Sheet

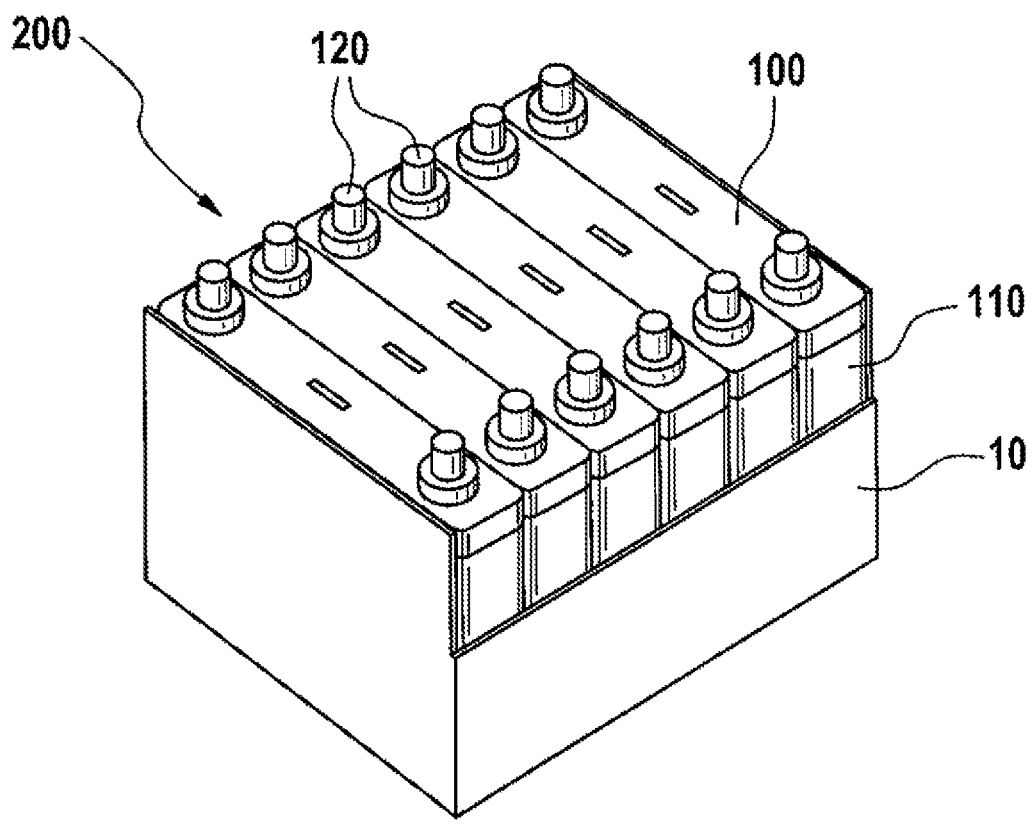

BATTERY CELL WITH PARTIALLY FLEXIBLE AND MOLDABLE WALL

BACKGROUND OF THE INVENTION

The present invention relates to a battery cell having at least one battery cell housing and at least one at least partially flexible and moldable wall, which is arranged on the battery cell housing. The invention also relates to a battery module with at least one battery cell.

Battery cells, particularly of lithium-ion batteries, are customarily fitted in a module, wherein between 5 and 20 cells are customarily arranged to form a battery module. Over time, battery cells, and particularly the battery cell housing, undergo changes associated with ageing. As a result, battery cells expand due to ageing and the associated formation of gas or increases in temperature, thereby resulting in the expansion of the volume of the battery cells in relation to the original state. In the event of different states of charge, the battery cells are also subject to expansion in the charged state, thereby resulting in the application of forces to the battery cell housing, such that the housing may deform. To date, it has been endeavored to suppress, or at least partially counteract this unwanted change in the volume of the battery cells by the use of "cell binding bands", which are particularly manufactured from a metallic material. These cell binding bands are generally arranged around the battery cells or on the battery cell housing, thereby forming a wall for the battery cell, such that the battery cell is compressed by the cell binding band, thereby counteracting expansion. The cell binding bands are generally arranged around the battery cell housing, and the ends thereof are welded or screwed. A further option for the combined arrangement and compression of the battery cells to form a battery module is provided wherein the battery cells are positioned in a housing and secured by mutual interconnection. Screws or bolts, amongst other means, are used as fixings for this purpose. Moreover, any cooling plate required is also secured to the battery cells or to the battery module.

SUMMARY OF THE INVENTION

According to the invention, the battery cell and the battery module have an at least partially flexible and moldable wall, which is comprised at least partially of a biomimetic material. A battery cell within the meaning of the invention is an electrical energy store, particularly an electrochemical energy store and/or an electrostatic energy store.

Characteristics and details described in conjunction with the battery cell according to the invention are naturally applicable in conjunction with the battery module according to the invention and vice versa such that, in respect of the disclosure of individual aspects of the invention, reciprocal reference thereto is made or is possible in all cases.

The wall according to the invention is at least partially comprised of a biomimetic material, and counteracts the pressure forces arising from the expansion of the battery cell or battery housing but, with the battery cells in their initial state, in which no expansion of volume is present, does not exert any counterforce upon the battery cell which might result in the deformation of the battery cell. Accordingly, in the initial state, the battery cell is not compressed or compacted, such that any resulting disadvantages including, for example, damage to the battery cell housing or impairments of capacity, are effectively prevented. The use of screws or bolts for the retention of the battery cells to form a module is thus rendered obsolete. Accordingly, a correspondingly configured housing can also be at least partially omitted. Security in the manufacture and/or assembly of the battery cells to form a battery module or battery is enhanced, in that the interconnection thereof by screwing is no longer required whereas this process, according to the prior art, has previously been hazardous and correspondingly complex.

A biomimetic material is preferably a synthetic material, which adopts phenomena from nature (in this case, from the gecko; cf. article "Gecko toe and lamellar shear adhesion on macroscopic, engineered rough surfaces"; Andrew G. Gillies, Amy Henry, Hauwen Lin, Angela Ren, Kevin Shivan, Ronald S. Fearing and Robert J. Full in the Journal of Experimental Biology (2014) 217, 283-289 doi:10.1242/jeb.092015) and advantageously translates these phenomena into technical characteristics. According to the invention, the biomimetic wall material is used to generate adhesion, particularly mechanical adhesion, between the wall and the battery cell housing. The adhesion force or force of attachment acts at the boundary surface layer, i.e. between the wall and the battery cell housing, and transmits forces exclusively in parallel to the surface of the wall or of the battery cell housing. Accordingly, associated pressure forces are only transmitted to the wall upon the expansion of the battery cell or battery cell housing, such that the change in volume of the battery cell or battery cell housing is counteracted by the adhesion forces. A further advantage of the mechanical adhesion of the biomimetic material, which is only initiated by expansion, is provided in that, under normal conditions, i.e. with the battery housing in its non-expanded state, the battery cell can be simply removed from the wall, without requiring the application of a substantial mechanical force for the separation e.g. of a metal cell binding band and/or screws. This permits the straightforward replacement of damaged battery cells. A further advantage of the wall is provided in that the latter can be used for the electrical insulation and/or thermal insulation of the battery cell or of a battery module. The process of manufacture and/or assembly is also improved, in that the screwing or welding step is omitted, thereby saving costs and enhancing the security of manufacture and/or assembly.

The wall according to the invention can particularly be arranged on an inner surface and/or on an outer surface of the battery cell housing, in particular at least partially form the battery cell housing. The biomimetic material wall can be configured with a correspondingly flexible design, and can be arranged on the inner surface of the battery cell housing and thus in the interior of the battery cell as well as on the outer surface of the battery cell housing. Mechanical adhesion thus acts at the boundary surface layer between the wall and the inner surface and the outer surface of the battery cell housing. Accordingly, it is conceivable that the wall is arranged both on the inner surface and on the outer surface of the battery cell housing, such that the expansion of the battery cell can be counteracted. It is also conceivable that the battery cell housing is at least partially formed of the biomimetic material or incorporates the latter, thereby forming the housing of the battery cell.

By this arrangement, material costs can be saved, as the battery cell housing requires no additional wall, but is constituted by the latter such that, in the fitting of the wall also, corresponding process steps can be omitted and costs saved accordingly.

The wall can be advantageously configured as a belt and/or as a mesh and/or as a film. In particular, the wall can be configured such that the battery cell is at least partially enclosed by the wall. The wall thus encloses from at least four sides a prismatic battery cell, or encloses the full circumference of a cylindrical battery cell. The belt-type wall can be arranged only sectionally on the battery cell or battery cell housing, such that a change in volume of the battery cell is counteracted in sections only. This can be advantageous if, on the grounds of cost, only those points on the battery cell which are subject to exceptionally high loading are fitted with a corresponding wall. A mesh-type and/or film-type configuration of the wall enables mechanical adhesion over a large surface area between the wall and the battery cell or battery cell housing. Advantageously, the wall at least partially encloses the battery cell or battery cell housing, thus permitting the achievement of the largest possible boundary surface layer between the battery cell and the wall, such that higher adhesion forces prevent, or at least limit an expansion of the battery cell. To this end, it is conceivable that the wall encloses the surface of the battery cell or the battery cell housing to a proportion of e.g. 10 to 90%. It is also conceivable that only the pole terminals and/or gas vent openings of the battery cell are kept clear of the wall, and that the remainder of the battery cell is enclosed by the latter. The expansion of the battery cell can thus be counteracted in multiple directions.

The wall according to the invention can be configured as a multi-component structure. The wall can thus be formed of a composite material, comprising a combination of a biomimetic material and a further material, such that the biomimetic material is only in sectional contact with the battery cell or the battery cell housing. The material combined with the biomimetic material can thus exhibit further properties which counteract the expansion of the battery cell, or which prevent or inhibit said expansion. Thus, at heavily-loaded points on the battery cell, e.g. on the edges, a material can be used which shows greater elasticity or higher rupture strength. It can thus be achieved, for example, that external mechanical forces exerted on the battery cell, e.g. by foreign bodies, can cause no damage to the battery cell or battery cell housing, or that said damage is restricted to the extent that the functional capability or safety of the battery cell can be maintained. The material can also be exceptionally heat-resistant, or can provide protection against low temperatures which might have negative consequences for the operation of the battery cell. Conceivable materials for this purpose include nylon polymers, which are configured as fibers and woven, thus resulting in exceptionally durable, heat-resistant and low-ductility fiber composites. Further fiber-reinforced plastics, comprised of reinforcing fibers and a plastic matrix, are conceivable for this purpose. Advantageous properties in fiber-reinforced plastics include directional elastic behavior, high rigidity and strength, and low weight.

The wall advantageously comprises polymer fibers, particularly polymer microfibers, wherein, particularly, the polymer fibers and/or polymer microfibers are at least partially configured with a spatula shape. The polymer fibers, and particularly the polymer microfibers increase the size of the boundary surface layer, and consequently the resulting adhesion forces which counteract the pressure forces originating from the battery cell. Given the presence of a large number of polymer fibers, particularly of polymer microfibers, the largest possible surface area of the wall to the battery cell or battery cell housing can thus be achieved, thereby enlarging the boundary surface layer and thus increasing mechanical adhesion. In a particularly advantageous configuration, the polymer fibers and/or polymer microfibers are filamentary, such that mechanical adhesion can be generated by the increased surface area, particularly by the action of van der Waals forces. The polymer fibers and/or polymer microfibers are thus arranged in large numbers on the wall, such that the filamentary fibers provide a large surface area within the most compact space, and thus can generate substantial forces, in the form of mechanical adhesion, by the action of van der Waals forces at the boundary surface layer. It is particularly advantageous if the polymer fibers and/or polymer microfibers are at least partially configured with a spatula shape. Particularly, the end of the polymer fibers and/or polymer microfibers which forms the boundary surface between the wall and the battery cell or the battery cell housing is thus configured with a spatula shape. Accordingly, toward the end which lies on the boundary surface, the polymer fibers and/or polymer microfibers become broader than at the end situated at the wall, particularly in those areas which lie in contact with the battery cell housing or battery cell. Accordingly, van der Waals forces acting at the boundary surface layer are increased by the enlarged surface area.

The polymer fibers and/or polymer microfibers of the wall are advantageously configured of polyurethane or polydimethylsiloxane, or incorporate at least one of these materials. Further materials including, e.g. elastomers, also constitute conceivable materials, wherein the flexible property of the material is particularly advantageous for the generation of van der Waals forces. These result from minute forces of attraction between the molecules of the battery cell or battery cell housing and the polymer fibers or microfibers, particularly the spatula-shaped section.

It is also conceivable that the wall is provided with at least one substrate, upon which the polymer fibers and/or polymer microfibers are arranged, in particular that the substrate is comprised of aramid fibers and/or carbon fibers and/or a fiber-reinforced plastic. The substrate for the polymer fibers and/or polymer microfibers is thus advantageously comprised of a harder material than the polymer fibers and/or polymer microfibers. The substrate ensures that the polymer fibers and/or polymer microfibers form a stable contact surface for the wall, and can be adapted to the geometry of the battery cell or the battery cell housing. The substrate can be correspondingly designed in a belt-type and/or mesh-type and/or film-type configuration, and either partially or totally provided with polymer fibers and/or polymer microfibers. The wall substrate itself is thus also configured for the accommodation of mechanical forces, and is particularly configured such that little or virtually no change in length can be achieved. It is particularly advantageous if the substrate is comprised of aramid fibers (Kepler) and/or carbon fibers (carbon) and/or a fiber-reinforced plastic (FRP). These materials are particularly characterized in that they exhibit directional elastic behavior, and correspondingly permit virtually no changes in length in the desired direction. Moreover, these materials are not electrically conductive and, at the same time, can be easily formed or manufactured in the form required. Aramid fibers and/or carbon fibers can also be manufactured in a woven form, which further permits the counteraction of mechanical loads associated with the change in volume of the battery cell. Both the biomimetic material of the wall and the substrate and/or the polymer fibers and/or polymer microfibers provide the advantage that they are impervious to soiling, other environmental influences, and both high and low temperatures. Consequently, these materials are not susceptible to oxidation or rust such that, in comparison with the cell binding bands of metallic material construction used to date, the wall according to the invention is less sensitive and more durable.

For the purposes of the invention, the polymer microfibers can be between 0.5 mm and 1 mm in length, wherein a length between 0.4 mm and 0.1 mm is preferred, and a length between 0.09 and 0.03 mm is particularly preferred. The length of the polymer microfibers is also dependent upon the size to which the spatula-shaped section of the polymer microfibers is configured. Material, and thus costs, can be saved by the use of shorter polymer microfibers. Longer polymer microfibers are easier to manufacture, and to apply to the substrate.

Advantageously, the diameter of the polymer microfibers, at least partially, or entirely, lies between 0.1 mm and 0.05 mm, wherein a diameter between 0.01 mm and 900 nm is preferred, and a diameter between 500 nm and 100 nm is particularly preferred. Polymer microfibers of larger diameter are easier and thus more cost-effective to manufacture and to apply to the surface of the substrate. Smaller polymer microfibers or those with a smaller diameter have an advantage, in that the surface area of the polymer microfibers, particularly at the end of the polymer microfibers, increases the boundary surface layer of the wall and the battery cell or battery cell housing. Particularly where the polymer microfibers are configured with a spatula shape, a smaller fiber diameter is advantageous, in that a greater wall surface area is thus provided by the fibers and, at the same time, a large number of fibers can be applied to the wall or to the wall substrate. Further advantages are associated with the smaller dimensions for the length and diameter of the fibers, whereby the self-cleaning of fibers can be achieved. The smaller, i.e. the shorter the fibers and the smaller their diameter, the more energetically advantageous it is that particles of soiling cannot adhere to the fibers, but remain adhered to the surface of the object to which the wall, and thus the polymer fibers and/or microfibers, are applied, in consequence whereof a wall incorporating a biomimetic material according to the invention can be reused, after it is removed from the surface, and positioned elsewhere or subsequently replaced in the same position, whereby adhesion forces or van der Waals forces will not be impaired by soiling.

For the purposes of the invention, the battery cell can be configured as a prismatic battery cell, or as a cylindrical battery cell, or as a button cell, or as a coffee-bag cell. In a prismatic battery cell, the wall according to the invention is arranged around at least four sides of the prismatic battery cell, such that the expansion of the battery cell can be counteracted on at least the four sides. In a cylindrical battery cell, the wall according to the invention can be arranged, for example, around the full circumference of the battery cell, and particularly can be incorporated into the winding of the battery cell. Correspondingly, the wall according to the invention will counteract an increase in volume of the cylindrical battery cell along the circumference of the battery cell or battery cell housing which is encompassed by the wall. In a button cell, the wall according to the invention can be arranged on the inner side and/or on the outer side of the button cell, in particular the wall according to the invention is arranged on the side or sides of the button cell having the largest surface area, as these are the first surfaces to be affected by a change in the volume of the button cell. The same applies to a coffee-bag cell, in which an arrangement on the side or sides having the largest surface area is also particularly preferred. As cylindrical, button and coffee-bag cells are particularly used in mobile applications, a wall according to the invention is advantageous due to the often small installation space.

According to a further aspect of the invention, a battery module with at least one battery cell according to the invention is claimed. The battery module is preferably comprised of a plurality of battery cells according to the invention, particularly between 2 and 20 battery cells. The battery cells are series- or parallel-connected in the battery module to form a unit, whereby the former are arranged to occupy the most compact space possible. According to the invention, it is conceivable that both the battery cell according to the invention and the battery module according to the invention is configured with a wall according to the invention. The wall can thus enclose only a proportion and/or all of the battery cells and/or part of the battery cell or the complete battery cell, in a desired arrangement. In the case of use of a cooling device, particularly in the form of a cooling plate, the wall can at least restrict, or entirely prevent, the movement of the battery cells or the battery modules. To this end, the wall can be arranged at least partially against or upon the cooling device and/or connect the cooling device to the battery cell and/or to the battery module. This arrangement provides all the advantages which have previously been described with respect to the battery cell according to the invention. Accordingly, the battery cells in the battery module are maintained in a desired shape by the wall according to the invention, without the application of substantial force where the battery cells are in a normal state. Only in response to an expansion in the volume of the battery cells will adhesion or van der Waals forces of the wall act on the battery cells and counteract a change in volume and thus a geometric alteration in the battery module. The configuration of the wall according to the invention in a biomimetic material is particularly advantageous, as the wall can be applied reversibly to the battery cells and/or the cooling device. Accordingly, individual battery cells can be simply and cost-effectively removed from the battery module according to the invention, and replaced with new battery cells. Conversely to cell binding bands and/or screw fixings of a metallic material, the advantage is thus provided that the separation of the welded joint and/or the release of the screw connection is no longer necessary, on the grounds that replacement is facilitated by the at least partially flexible and moldable wall. The wall according to the invention is thus arranged around the plurality of battery cells as a whole and/or around individual battery cells, for example by positioning or winding around the latter, such that virtually no compressive forces are applied to the individual battery cells. Only in response to the expansion of one or more battery cells will adhesion forces or van der Waals forces be exerted at the boundary surface layer between the wall and the battery cells or battery cell housing, such that an expansion of the battery cells or housing is counteracted.

According to a further aspect of the invention, a battery, particularly a lithium-ion battery is claimed. The battery according to the invention is thus provided with at least one battery module according to the invention, with at least one battery cell, particularly with at least one battery cell according to the invention. The battery according to the invention also provides all the advantages which have already been described in conjunction with the battery cell according to the invention and with the battery module according to the invention. Herein, a wall according to the invention, which is at least partially comprised of a biomimetic material, encloses individual and/or a plurality of battery cells and/or battery modules.

BRIEF DESCRIPTION OF THE DRAWINGS

The FIGURE below is provided for descriptive purposes only, and is not intended to restrict the invention in any form. Herein, schematically:

FIG. 1 shows a potential form of embodiment of the battery module according to the invention, with battery cells according to the invention.

DETAILED DESCRIPTION

FIG. 1 shows a battery module 200 according to the invention, with six battery cells 100 according to the invention. The battery cells 100 are each provided with a battery cell housing 110, wherein the wall 10 according to the invention is arranged on the battery cell housings 110 of the battery cells 100. In FIG. 1, the wall 10 according to the invention is arranged on five sides of the battery module 200 according to the invention. Only the side of the battery cells 100 on which the pole terminals 120 of the battery cells 100 are arranged is not enclosed by the wall 10. The wall 10 thus forms a receptacle for the battery cells 100, in which the battery cells 100 can be arranged. This receptacle permits the straightforward replacement of the battery cells 100 in the battery module 200 such that, in the event of a defective battery cell 100, the latter can easily be removed from the module and replaced with a new battery cell 100. This only requires the release of the cell connectors from the pole terminals 120 of the battery cells 100 such that the battery cell 100, in the direction of the pole terminals 120 of the battery cell 100, can be extracted from the battery module 200 and thus from the wall 10. It can thereby be achieved that the battery cells 100 in the battery module 200 in the desired position can only be moved in the direction of the pole terminals 120 of the battery cell 100. In all other directions, the battery cells 100 are maintained in position by the wall 10. In FIG. 1, the wall 10 is arranged on the full side of the battery cell 100 or battery housing 110 which has the largest surface area. Accordingly, the outward-facing sides of the two outermost battery cells 100 are provided with complete or full-surface covering by the wall 10. On the other sides of the battery cells 100, the wall is only partially arranged on the battery cell housing 110, thus permitting the achievement of material savings. The forces applied to the outer side of the battery cell 100 with the largest surface area are thus greater than the forces acting on the short side of the battery cell 100. Accordingly, the largest changes in volume will occur on those sides of the battery cell 100 which have the largest surface area. Correspondingly, the wall 10 on these surfaces, and at exceptionally heavily-loaded points on the battery cell 100, is preferably configured in a large-area arrangement.

The invention claimed is:

1. A battery cell (100) having at least one battery cell housing (110) and at least one at least partially flexible and moldable wall (10), wherein the wall (10) is arranged on the battery cell housing (110),
characterized in that the wall (10) is comprised at least partially of a biomimetic material, wherein the biomimetic material generates mechanical adhesion between the wall (10) and the battery cell housing (110) only upon expansion of the battery cell (100) or the battery cell housing (110); and
characterized in that the wall (10) comprises polymer fibers or polymer microfibers, wherein the end of the polymer fibers or the polymer microfibers forms a boundary surface between the wall (10) and the battery cell housing (110).

2. The battery cell (100) according to claim 1, characterized in that the wall (10) is arranged on an inner surface and/or on an outer surface of the battery cell housing (110).

3. The battery cell (100) according to claim 1, characterized in that the wall (10) is configured as a belt and/or as a mesh and/or as a film.

4. The battery cell (100) according to claim 1, characterized in that the wall (10) is configured as a multi-component structure.

5. The battery cell (100) according to claim 1, characterized in that the wall (10) comprises polymer fibers.

6. The battery cell (100) according to claim 5, characterized in that the polymer fibers that are at least partially configured with a spatula shape.

7. The battery cell (100) according to claim 5, characterized in that the wall (10) is provided with at least one substrate, upon which the polymer fibers are arranged.

8. The battery cell (100) according to claim 7, characterized in that the substrate is comprised of aramid fibers and/or carbon fibers and/or a fiber-reinforced plastic.

9. The battery cell (100) according to claim 1, characterized in that the wall (10) comprises polymer microfibers.

10. The battery cell (100) according to claim 9, characterized in that the polymer microfibers that are at least partially configured with a spatula shape.

11. The battery cell (100) according to claim 9, characterized in that the wall (10) is provided with at least one substrate, upon which the polymer microfibers are arranged.

12. The battery cell (100) according to claim 11, characterized in that the substrate is comprised of aramid fibers and/or carbon fibers and/or a fiber-reinforced plastic.

13. The battery cell (100) according to claim 9, characterized in that the polymer microfibers are between 0.5 mm and 1 mm in length.

14. The battery cell (100) according to claim 9, characterized in that the polymer microfibers are between 0.3 mm and 0.1 mm.

15. The battery cell (100) according to claim 9, characterized in that the polymer microfibers are between 0.08 and 0.03 mm in length.

16. The battery cell (100) according to claim 9, characterized in that the diameter of the polymer microfibers, at least partially, lies between 0.1 mm and 0.05 mm.

17. The battery cell (100) according to claim 9, characterized in that the diameter of the polymer microfibers, at least partially, lies between 0.01 mm and 900 nm.

18. The battery cell (100) according to claim 9, characterized in that the diameter of the polymer microfibers, at least partially, lies between 500 nm and 100 nm.

19. The battery cell (100) according to claim 1, characterized in that the battery cell (100) is configured as a prismatic battery cell (100), or as a cylindrical battery cell (100), or as a button cell (100), or as a coffee-bag cell (100).

20. The battery cell (100) according to claim 1, characterized in that the wall (10) is configured as a belt and/or as a mesh and/or as a film, and is configured such that the battery cell (100) is at least partially enclosed by the wall (10).

21. A battery module (200) with at least one battery cell (100), having an at least partially flexible and moldable wall (10), wherein the wall (10) is arranged on the battery cell housing (110),
- characterized in that the wall (10) is comprised at least partially of a biomimetic material, wherein the biomimetic material generates mechanical adhesion between the wall (10) and the battery cell housing (110) only upon expansion of the at least one battery cell (100) or the battery cell housing (110); and
- characterized in that the wall (10) comprises polymer fibers or polymer microfibers, wherein the end of the polymer fibers or the polymer microfibers forms a boundary surface between the wall (10) and the battery cell housing (110).

22. The battery module (200) according to claim 21,
- characterized in that the wall (10) is arranged on an inner surface and/or on an outer surface of the battery cell housing (110).

* * * * *